US008091360B2

(12) United States Patent
Hoetger

(10) Patent No.: US 8,091,360 B2
(45) Date of Patent: Jan. 10, 2012

(54) DRIVING DEVICE

(75) Inventor: Michael Hoetger, Berlin (DE)

(73) Assignee: Amovis GmbH, Berlin (DE)

( * ) Notice: Subject to any disclaimer, the term of this patent is extended or adjusted under 35 U.S.C. 154(b) by 860 days.

(21) Appl. No.: 11/989,924

(22) PCT Filed: Jul. 31, 2006

(86) PCT No.: PCT/EP2006/064868
§ 371 (c)(1),
(2), (4) Date: Feb. 1, 2008

(87) PCT Pub. No.: WO2007/014942
PCT Pub. Date: Feb. 8, 2007

(65) Prior Publication Data
US 2010/0212304 A1  Aug. 26, 2010

(30) Foreign Application Priority Data

Aug. 3, 2005 (DE) .......................... 10 2005 037 109

(51) Int. Cl.
*F01K 23/10* (2006.01)
*F01K 25/06* (2006.01)
*F01K 25/08* (2006.01)

(52) U.S. Cl. ................. 60/618; 60/649; 60/651

(58) Field of Classification Search ............ 60/616–618, 60/649, 651, 653, 671
See application file for complete search history.

(56) References Cited

U.S. PATENT DOCUMENTS

| | | | |
|---|---|---|---|
| 4,232,522 A | 11/1980 | Steiger | |
| 4,733,536 A * | 3/1988 | DiBella et al. | 60/618 |
| 5,609,029 A * | 3/1997 | Ahnger et al. | 60/618 |
| 6,032,467 A * | 3/2000 | Oshita et al. | 60/651 |
| 6,845,618 B2 * | 1/2005 | Niikura et al. | 60/618 |
| 6,935,129 B2 | 8/2005 | Sasaki et al. | |
| 7,454,911 B2 * | 11/2008 | Tafas | 60/618 |
| 7,458,217 B2 * | 12/2008 | Kalina | 60/651 |
| 7,520,133 B2 * | 4/2009 | Hoetger et al. | 60/618 |
| 7,536,998 B2 * | 5/2009 | Held et al. | 123/563 |
| 7,874,154 B2 * | 1/2011 | Raab et al. | 123/563 |
| 2005/0144949 A1 | 7/2005 | Hamada | |
| 2005/0262842 A1* | 12/2005 | Claassen et al. | 60/618 |
| 2006/0096289 A1* | 5/2006 | Kalina | 60/649 |
| 2007/0056284 A1* | 3/2007 | Kalina | 60/618 |

FOREIGN PATENT DOCUMENTS

| | | |
|---|---|---|
| DE | 10 2004 019668 | 11/2004 |
| FR | A1-2 418 872 | 9/1979 |
| JP | 08144850 | 4/1996 |
| JP | 10205308 A * | 8/1998 |
| JP | 10317918 A * | 12/1998 |

* cited by examiner

*Primary Examiner* — Thai Ba Trieu

(74) *Attorney, Agent, or Firm* — Thorpe North & Western LLP

(57) ABSTRACT

The invention relates to a drive system for motor vehicles comprising a waste heat-producing internal combustion engine and a circuit for draining off at least partially said waste heat with a working fluid which is relievable in an expansion machine, wherein said working fluid comprises several components, wherein at least one component is transferable into a gas phase by absorbing heat of the internal combustion engine and/or another source inside the drive system which also comprises means for separating the liquid fraction from the working fluid prior to the expansion machine pressure removal. The internal combustion engine can be cooled by a first cooling circuit. A second cooling circuit can be used in such a way that the first cooling circuit is cooled thereby.

16 Claims, 2 Drawing Sheets

DRIVING DEVICE

TECHNICAL FIELD

The invention relates to a drive system for motor vehicles comprising a combustion engine generating waste heat and a circuit for removing at least a portion of this waste heat by means of a working fluid which is adapted to be expanded in an expansion machine.

The invention also relates to a working fluid for the use in such a drive system and its use.

Such a drive system is, for example, an engine with internal combustion, such as a Diesel- or Otto engine in a car or a truck. The combustion engine combusts fuel in a cylinder. The combustion heat generated therein is converted into mechanical energy. This mechanical energy is transferred to a driving shaft which is used to drive the vehicle. The working fluid in known cooling circuits is normally water.

Due to thermodynamic laws it is practically not possible to use the entire heat generated in the system. Therefore, a large amount of waste heat is generated which is disposed off to the environment. A portion of this waste heat is directly released to the environment with the hot exhaust gas. Another portion is removed through a cooling circuit.

PRIOR ART

In engines having much power a corresponding large amount of heat is generated which must be removed. It is an object of developments to develop compact cooling systems with high cooling power. Commonly air cooling systems are used for cooling the cooling medium which use the air flow. If this cooling is not sufficient an ventilation is switched on, if necessary. However, this causes the problem that the ventilation itself requires a portion of the energy of the engine. The covering of the energy consumption may cause a further increase of the temperature of the drive system.

There have been attempts in the past to use the waste heat from thermodynamic processes.

From DE 100 54 022 A1 a cooling is known, where hot steam of a working medium is converted to mechanical energy by means of an expansion device. In order to account for the different pressure—and temperature conditions a boiling container is provided where a heat transfer is effected at a low temperature and at a low pressure and a pressure tank is provided where the liquid working medium is injected at a high temperature and a high pressure from the boiling container. The working medium evaporates in the pressure tank. Two containers are used in such a system and a large amount of water steam is generated thereby causing the system to become very voluminous.

It is also known in the art to use hot exhaust gas as a heat source in an additional circuit process with an expander and a condenser. The heat generated at the condenser is fed to the existing cooling system in addition to the heat from the combustion engine. Thereby, the cooling system is even more stressed.

DISCLOSURE OF THE INVENTION

It is an object of the invention to provide a drive system of the above mentioned kind with a cooling device which has an increased cooling power and which can have a smaller design.

According to the present invention, this object is achieved in that the working fluid comprises a plurality of components, one of these components is adapted to be transferred to a gaseous state by absorbing heat from the combustion engine and/or further heat sources within the drive system, and means are provided for separating the liquid portion of the working fluid before its expansion in the expansion machine. The combustion engine can be cooled by a first cooling circuit and a second cooling can be provided for cooling the first cooling circuit. The means for separating the liquid portion of the working fluid can be a phase separator.

Such a second circuit can be integrated into existing drive systems without much effort. The waste heat of the first cooling circuit is used to make it more compact and to provide for an increased cooling power. Additionally to the heat of the increased temperature of the working fluid the evaporation enthalpy necessary for the evaporation of the one component is absorbed. Thereby the cooling power can be essentially increased with the same mass flow rate.

A portion of the waste heat is recycled to useful energy. If the expansion machine drives the driving shaft of the combustion engine the drive system has an increased power and a better efficiency. The combustion engine can also operate with a higher efficiency and requires less cooling power.

Alternatively the expansion machine can drive a generator for the generation of electricity. In such an application as an auxiliary power unit the expansion machine can be connected to the drive shaft through a coupling and it can be operated independently from the combustion engine. In such case preferably an additional burner is provided as a heat source for the operation of the expansion machine independently of the combustion engine.

By using a component with a low boiling point in the working fluid a low minimum temperature is achieved after the expansion. Contrary to this the second circuit can operate at a higher thermodynamic medium temperature through the heat exchanger cooled by the air flow.

Due to the improved heat absorption the maximum temperature of the combustion can be decreased upon use of an air charge cooling system. This causes a decrease of the nitrogen oxide ($NO_x$)-emissions.

As the component with a low boiling point generally has a lower freezing point also, the solution provides a good protection against freezing also.

Additionally to the first cooling circuit further heat sources can be provided which are arranged before the second circuit in the order of their temperature within the circuit starting with the lowest temperature. Such heat sources can be used without burdening the first cooling circuit. Thereby an efficient use of the waste heat is possible.

Preferably, the combustion engine is provided with an exhaust gas recirculation system and the heat of this exhaust gas recirculation system is fed to the circuit. In addition to known advantages of an exhaust gas recirculation system where emissions are reduced a heat source with high temperature for the second circuit is provided by the exhaust gas. Thereby the efficiency of the second circuit is increased.

Furthermore, the combustion engine can be provided with a turbo charger, where its charge air cooling and/or waste heat is fed to the circuit. The mass flow of the second circuit can be flowed through the low temperature side of the charge air cooling of the turbo charger before the cooling with the first cooling circuit. After the heat absorption from the first cooling circuit heat can be absorbed on the high temperature side of the charge air cooling of the turbo charger.

A plate heat exchanger can be provided for the heat transfer from the first cooling circuit to the second circuit. Preferably the second circuit comprises a pump for pumping the working fluid at an increased pressure level.

Preferably the second circuit comprises a multi-stage air cooler.

In a special modification of the invention the working fluid comprises a liquid carrier medium and at least one medium with a low boiling point dissolved in the carrier medium. This medium may also be a gaseous medium. Preferably the carrier medium is selected in such a way that all the other media can be well dissolved therein. The kind and the portion of the media dissolved in the carrier medium can be adapted to the pressure—and temperature conditions caused by the heat sources, in order to achieve an evaporated portion of at least one medium which is as large as possible under these conditions. In such a way a homogenous working medium is formed which forms gaseous components upon increasing heat absorption which can be separated with a phase separator. When such gaseous components evaporate they absorb additional evaporation enthalpy. Thereby a particularly efficient cooling is achieved. By selecting the components in such a way that a portion of the component which is as large as possible is evaporated particularly much evaporation enthalpy is absorbed and the heat transfer is optimized.

In a preferred embodiment of the invention the carrier medium is water and the medium dissolved in the water is ammonia. Both components are polar, dissolve well and have a high evaporation enthalpy. Correspondingly, for example ethanol, methanol, acetic acid or $CO_2$ can be used. However, it is also possible to use nonpolar components, such as a solution of benzene in oil.

Further modifications of the invention are subject matter of the subclaims. An embodiment is described below in greater detail with reference to the accompanying drawings.

DESCRIPTION OF A PREFERRED EMBODIMENT

Figure 1:
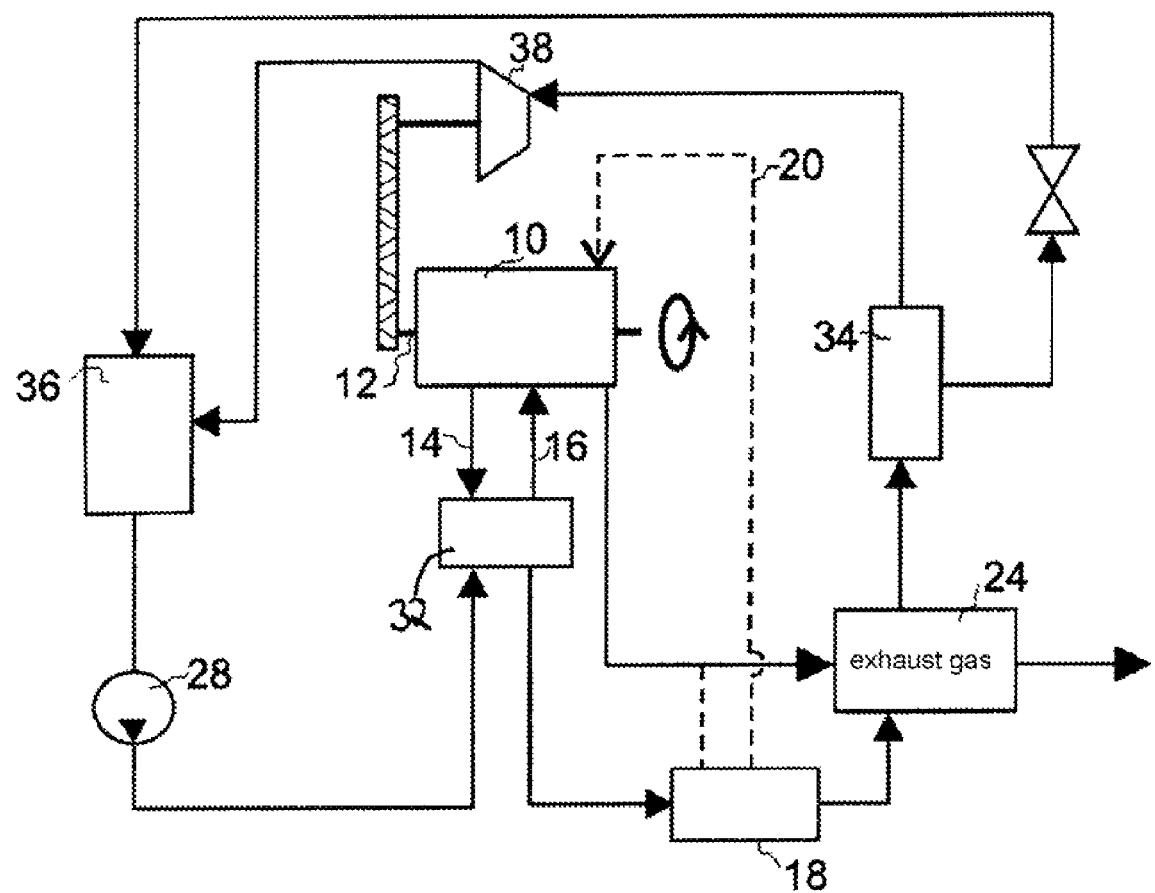
FIG. 1 is a schematic view of a water cooled combustion engine with an exhaust gas recirculation system and a turbo charger.
Figure 2:
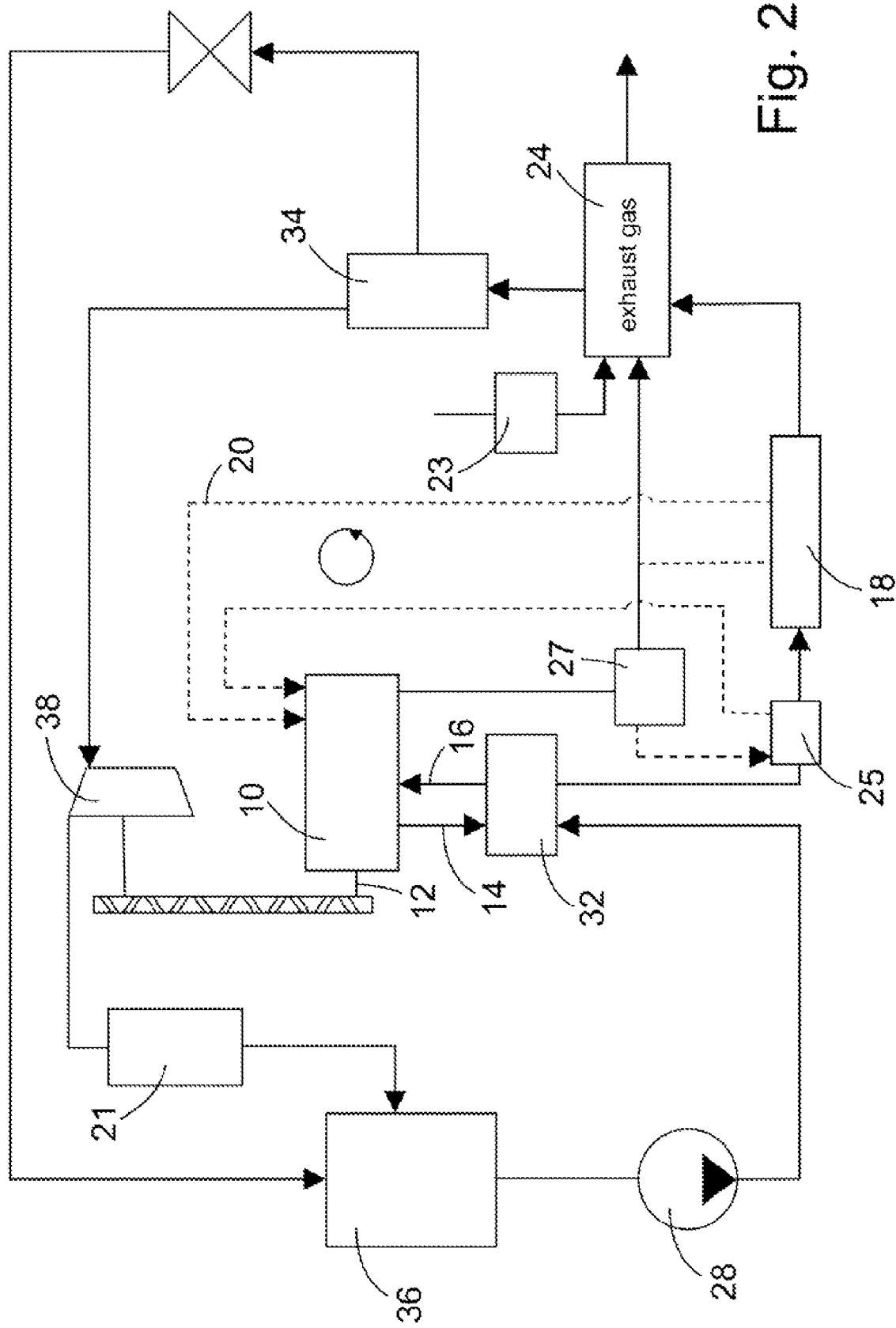
FIG. 2 is a schematic view of a water cooled combustion engine similar to that of FIG. 1 and additionally including a turbo charger 27 with a charge air cooler 25, an additional burner 23, and a precipitator 21.

In FIG. 1 an embodiment of the invention is schematically shown using the example of a charged diesel engine for cars. It is understood that the invention is also suitable for any other combustion engine and that apart from cars also trucks, trains, farm machines and the like can be driven.

The diesel engine is generally denoted with numeral 10. The diesel engine 10 drives a driving shaft 12. The way of operation of a diesel engine is commonly known prior art and must, therefore, not be described here in greater detail. The diesel engine 10 operates with a power range of typically 100 kW. It produces waste heat in the range of 250 kW. The generated waste heat is transferred to the cooling water of a first cooling system 14 and 16, respectively. On the other hand, hot exhaust gas is generated a portion of which is recycled by recirculation to the engine in an exhaust gas recirculation system 18 to avoid the formation of damaging emissions. This is represented by a dotted line 20.

The described components are well known components of a diesel engine drive system. Contrary to known drive systems the cooling cycle 14 and 16, respectively, are cooled by another cycle. In this cycle a multi-component solution is pumped as a working fluid by a pump 28 to an increased pressure level of about 15 bar. In the present case the working fluid consists of a carrier solution, which is water and a gas dissolved therein, which is ammonia. The mass ratio of water to ammonia is 65:35.

At first, the aqueous ammonia solution receives heat from the cooling cycle of the engine at about 90° C. through a plate heat exchanger 32. The first cooling cycle of the combustion engine 10 is cooled in this plate heat exchanger. The hot cooling water 14 of about 90° C. is cooled down to about 83° C. The working fluid is heated to about 90° C. at this heat exchange point. A portion of the dissolved ammonia gas is evaporated thereby. The heat absorption of the working fluid is due to the partial evaporation of the ammonia from the working fluid very large, so that the entire waste heat of the cooling system can be transferred to the working fluid with small flow rates.

In a second heat transfer the heat from the exhaust gas of the exhaust gas recirculation system 18 is transferred to the working fluid. The heat transfer is about 17 kW. The temperature of the recirculated exhaust gas is considerably decreased so that the maximum temperature of the combustion in the combustion engine is decreased and thereby the emissions of nitrogen oxide. The medium temperature of the working fluid is then about 110° C.

In a third heat exchanger 24, a portion of the heat of the exhaust gas is transferred to the working fluid thereby producing the desired end temperature of the working fluid. The temperature of the working fluid reaches 150° C. and a large portion of the ammonia originally dissolved in the water is evaporated.

Subsequently, the liquid phase of the working fluid, mainly water, is separated from the gaseous phase, mainly ammonia, in a phase separator 34. The liquid water is easily brought to a lower pressure level of about 2 bar at 150° C. and cooled in a, for example, air cooled cooler. The gas pressurized at 15 bar is fed to an expansion machine 38, for example a rotational piston machine, a piston machine, a screw machine or a turbine, and expanded to a pressure of 2 bar. The useful mechanical power is in the range of up to 10 kW and can be fed to the shaft 12. With the expansion not only the pressure level but also the temperature of this component of the working fluid is decreased. The cold working fluid is also fed to the cooler. It is dissolved therein in the hot carrier medium thereby releasing dissolving heat. The cool working fluid is fed to the circuit again from the cooler through the pump 28. The cooler can be in two-portion form as the processes "mixing" and "cooling" of the working fluid require different conditions of the components. For example, a mixing path can be arranged below the cooler to achieve a good mixing of the working fluid flows and to feed them to the cooler 36 in well mixed state.

The cooling power necessary by the cooling system is similar to a conventional drive system without a second circuit although it absorbs heat from the exhaust gas.

The values for the power of a combustion engine and for the heat exchanges mentioned above as an example can obviously be adapted to the various applications. For example, further heat sources, such as an oil cooling, a charge air cooling or the like can be integrated into the second circuit. Also, solutions with different and/or further components may be used which are adapted to the kind and the portion of the heat sources. It is the ultimate goal to enable a good heat transfer and high absorption rate of evaporation enthalpy. Thereby all components can be very compact. The driving power is increased. The efficiency of the entire driving is increased also. Thereby the damaging emissions are reduced for the same required overall power.

The thermodynamic medium temperature of the cooler cooled by the air flow is about 110° C. which is higher than in conventional cooling circuits with about 90° C. This causes a reduction of the necessary cooling surface. Thereby, the size of the cooler can be reduced. By using a component with a low boiling power (ammonia) the maximum temperature of 150° C. is lower than in known one-component systems, as it is the case with, for example, water. They must operate at about 500° C. to achieve a sufficient efficiency. Due to the low minimum temperature of up to 10° C. the minimum temperature of the circuit is much lower than in a one component system. One may compare: A one component system operating with water has a lowest temperature of 100° C. at 1 bar. By this low lowest temperature a good thermal efficiency is achieved.

Drive systems where there are not sufficient heat sources available for evaporation of the entire portion of the working fluid can be provided with a bypass. They return a corresponding portion of the working fluid directly back to the cooler after flowing through the plate heat exchanger.

The invention claimed is:

1. A drive system for motor vehicles comprising:
a combustion engine generating waste heat;
a first cooling circuit for absorbing at least a portion of said waste heat;
a second cooling circuit with a working fluid for absorbing heat from the first cooling circuit for cooling the first cooling circuit;
an expansion machine for expanding said working fluid, wherein
said working fluid comprises a mixture of a plurality of components having different boiling points,
at least one of said plurality of components is selected in such a way that it is transferred to a gaseous state upon absorbing heat from said first circuit, while at least one of said plurality of components remains in a liquid state, and
means are provided for separating said component remaining in said liquid state from said component in a gaseous state before expanding said component in said gaseous state in said expansion machine;
wherein the working fluid comprises oil or any other lubricant.

2. The drive system according to claim 1, wherein a precipitator for the oil or the other lubricant is provided in the circuit downstream of the expansion machine and means are provided for feeding the oil or the other lubricant upstream of the expansion machine.

3. A drive system for motor vehicles comprising:
a combustion engine generating waste heat;
a first cooling circuit for absorbing at least a portion of said waste heat;
a second cooling circuit with a working fluid for absorbing heat;
an expansion machine for expanding said working fluid, wherein
said working fluid comprises a mixture of a plurality of components having different boiling points,
at least one of said plurality of components is selected in such a way that it is transferred to a gaseous state upon absorbing heat, while at least one of said plurality of components remains in a liquid state, and
means are provided for separating said component remaining in said liquid state from said component in a gaseous state before expanding said component in said gaseous state in said expansion machine;
wherein the combustion engine is cooled by the first cooling circuit and the first cooling circuit is cooled by the second cooling circuit;
wherein additionally to the first cooling circuit further heat sources are provided, each of said further heat sources having a temperature and being arranged within the second circuit upstream of the expansion machine in the order of their temperature starting with the lowest temperature; and
wherein said working medium comprises a liquid carrier medium selected in such a way that all other media are well dissolved therein and wherein a kind and a portion of the media dissolved in the carrier medium are adapted to pressure and temperature conditions caused by the heat sources, in order to achieve an evaporated portion of at least one medium which is as large as possible under the pressure and temperature conditions.

4. The drive system according to claim 3, wherein the means for separating the component remaining in the liquid state from the component in a gaseous state is a phase separator.

5. The drive system according to claim 3, wherein a driving shaft is provided, said driving shaft being driven by the combustion engine and the expansion.

6. The drive system according to claim 3, wherein the combustion engine is provided with an exhaust gas recirculation system and wherein heat of this exhaust gas recirculation system is fed to the second circuit as one of said further heat sources.

7. The drive system according to claim 3, wherein the combustion engine is provided with a turbo charger having a charge air cooling system and producing waste heat and wherein at least one of the charge air cooling and waste heat is fed to the second circuit as one of said further heat sources.

8. The drive system according to claim 3, wherein the expansion machine is connected to the driving shaft through a coupling and that the expansion machine is adapted to be operated independently from the combustion engine.

9. The drive system according to claim 8, and further comprising a burner as an additional heat source for operating the expansion machine independently from the combustion engine.

10. The drive system according to claim 3, and further comprising a plate heat exchanger for the heat transfer from the first cooling circuit to the second cooling circuit.

11. The drive system claim 3, wherein the second cooling circuit comprises a pump for pumping the working fluid at an increased pressure level.

12. The drive system claim 3, wherein the second cooling circuit comprises a multi-stage air cooler.

13. The drive system according to claim 3, wherein said liquid carrier medium comprises at least one medium with a low boiling point dissolved in the liquid carrier medium.

14. The drive system according to claim 3, wherein the liquid carrier medium is water.

15. The drive system according to claim 14, wherein one of the media dissolved in the water is ammonia.

16. A drive system for motor vehicles comprising:
a combustion engine generating waste heat;
a first cooling circuit with a first working fluid for absorbing at least a portion of said waste heat, wherein the combustion engine is cooled by the first cooling circuit;
a second cooling circuit with a first cooling circuit heat exchanger, the second cooling circuit having a second working fluid for absorbing heat from the first cooling circuit through the first cooling circuit heat exchanger and the first cooling circuit heat exchanger having a first cooling circuit heat exchanger temperature, wherein the first cooling circuit is cooled by the second cooling circuit;

at least one additional heat source having an at least one additional heat source heat exchanger coupled to the second cooling circuit and having an at least one additional heat source heat exchanger temperature, said second working fluid absorbing heat from the at least one additional heat source through the at least one additional heat source heat exchanger; and an expansion machine for expanding at least a portion of said second working fluid, wherein said second working fluid comprises a mixture of a plurality of components having different boiling points, at least one of said plurality of components is selected in such a way that it is transferred to a gaseous state upon absorbing said heat from said first heating circuit, while at least one of said plurality of components remains in a liquid state, means are provided for separating said component remaining in said liquid state from said component in a gaseous state before expanding said component in said gaseous state in said expansion machine, the first cooling circuit heat exchanger and the at least one additional heat source heat exchanger are arranged within the second circuit in the order of their temperature starting with the lowest temperature, and a carrier medium is selected in such a way that all other media are well dissolved therein and wherein a kind and a portion of the media dissolved in the carrier medium are adapted to the pressure and temperature conditions caused by the first cooling circuit heat exchanger and the at least one additional heat source heat exchanger, in order to achieve an evaporated portion of at least one medium which is as large as possible under the temperature and pressure conditions.

* * * * *